(12) United States Patent
Hasegawa et al.

(10) Patent No.: US 11,514,516 B2
(45) Date of Patent: Nov. 29, 2022

(54) BANKING OPERATION SUPPORT SYSTEM, BANKING OPERATION SUPPORT METHOD, AND BANKING OPERATION SUPPORT PROGRAM

(71) Applicant: MIZUHO BANK, LTD., Tokyo (JP)

(72) Inventors: Machiko Hasegawa, Tokyo (JP); Shinya Ide, Tokyo (JP); Kyoji Kanemitsu, Tokyo (JP); Tetsuya Kamijo, Tokyo (JP); Martin Tangel, Tokyo (JP)

(73) Assignee: MIZUHO BANK, LTD., Tokyo (JP)

( * ) Notice: Subject to any disclaimer, the term of this patent is extended or adjusted under 35 U.S.C. 154(b) by 692 days.

(21) Appl. No.: 16/328,192

(22) PCT Filed: Aug. 27, 2018

(86) PCT No.: PCT/JP2018/031595
§ 371 (c)(1),
(2) Date: Feb. 25, 2019

(87) PCT Pub. No.: WO2020/044408
PCT Pub. Date: Mar. 5, 2020

(65) Prior Publication Data
US 2021/0383466 A1    Dec. 9, 2021

(51) Int. Cl.
*G06Q 40/02* (2012.01)
*G06Q 40/00* (2012.01)
(Continued)

(52) U.S. Cl.
CPC .......... *G06Q 40/025* (2013.01); *G06N 20/00* (2019.01); *G06Q 40/06* (2013.01); *G06Q 40/12* (2013.12)

(58) Field of Classification Search
CPC ........ G06Q 10/00; G06Q 30/02; G06Q 30/04; G06Q 30/06; G06Q 40/00; G06Q 40/02;
(Continued)

(56) References Cited

U.S. PATENT DOCUMENTS 6,941,287 B1 * 9/2005 Vaidyanathan ........ G06N 3/126
706/14
8,423,323 B2 * 4/2013 Bonabeau .............. G06Q 10/06
705/14.66

(Continued)

FOREIGN PATENT DOCUMENTS

JP    2005-352728 A    12/2005
JP    2007-047940 A    2/2007
(Continued)

OTHER PUBLICATIONS

International Search Report and Written Opinion for PCT/JP2018/031595 dated Nov. 6, 2018, all pages.
(Continued)

*Primary Examiner* — Andrew Joseph Rudy
(74) *Attorney, Agent, or Firm* — Kilpatrick Townsend & Stockton LLP (57) ABSTRACT

Provided are a system, a method, and a program of banking operation support for supporting execution of accurate and efficient banking operations. A control unit (21) of a support server (20) acquires external state information, a financial transaction condition, customer state information, and a financial transaction state of the same time period, from a back-end system (40); performs machine learning using a data set made up of the acquired pieces of information as learning data, and generates a customer action prediction model which associates the financial transaction condition with the financial transaction state; and calculates, for a current external state and a current customer state, a financial transaction condition corresponding to a target value of
(Continued)

a transaction state using the customer action prediction model.

9 Claims, 7 Drawing Sheets

(51) Int. Cl.
  G06N 20/00 (2019.01)
  G06Q 40/06 (2012.01)
(58) Field of Classification Search
  CPC ........ G06Q 40/04; G06Q 40/06; G06Q 50/10; G06Q 90/00
  USPC .......................................................... 705/30
  See application file for complete search history.

(56) References Cited

U.S. PATENT DOCUMENTS

| | | | | |
|---|---|---|---|---|
| 8,556,167 | B1* | 10/2013 | Nichols | G06Q 20/405 |
| | | | | 235/379 |
| 8,645,270 | B2* | 2/2014 | Mallean | G06Q 20/3827 |
| | | | | 705/39 |
| 8,799,150 | B2* | 8/2014 | Annappindi | G06Q 40/04 |
| | | | | 705/322 |
| 10,360,631 | B1* | 7/2019 | Jezewski | G06Q 40/06 |
| 10,372,310 | B2* | 8/2019 | Martinez Del Corral | |
| | | | | G06F 3/04886 |
| 10,607,284 | B2* | 3/2020 | Loganathan | G06Q 40/02 |
| 10,636,093 | B1* | 4/2020 | Christopolous | G06Q 40/025 |
| 10,872,369 | B1* | 12/2020 | Kurani | G06Q 30/0631 |
| 10,902,514 | B2* | 1/2021 | Barkas | G06Q 40/025 |
| 11,126,893 | B1* | 9/2021 | Laaser | G06F 17/11 |
| 2007/0226163 | A1* | 9/2007 | Robles | G06Q 40/06 |
| | | | | 706/50 |
| 2008/0120129 | A1* | 5/2008 | Seubert | G06Q 10/10 |
| | | | | 705/35 |
| 2009/0144123 | A1* | 6/2009 | Malov | G06Q 30/0201 |
| | | | | 705/7.29 |
| 2009/0271301 | A1* | 10/2009 | Clode | G06Q 40/12 |
| | | | | 705/30 |
| 2017/0200192 | A1* | 7/2017 | DeAngelo | G06Q 30/0255 |
| 2019/0318421 | A1* | 10/2019 | Lyonnet | G06N 20/20 |
| 2021/0217102 | A1* | 7/2021 | Chen | G06F 16/2465 |

FOREIGN PATENT DOCUMENTS

| | | |
|---|---|---|
| JP | 2016-173649 A | 9/2016 |
| JP | 2016-177477 A | 10/2016 |
| JP | 2017-049673 A | 3/2017 |

OTHER PUBLICATIONS

Rejection reason notification for Japanese Patent Application No. 087568/2019 dated Oct. 21, 2022, all pages.

* cited by examiner

BANKING OPERATION SUPPORT SYSTEM, BANKING OPERATION SUPPORT METHOD, AND BANKING OPERATION SUPPORT PROGRAM

TECHNICAL FIELD

The present disclosure relates to a banking operation support system, a banking operation support method, and a banking operation support program for supporting banking operations.

BACKGROUND ART

Banks provide various financial services and instruments such as deposits and loans. A technology of predicting actions of customers of a financial institution and proposing services and instruments to the customers has been studied (for example, see Patent Documents 1 and 2). A technology disclosed in Patent Document 1 motivates customers only who are probable to visit a store. A customer action management server disclosed in Patent Document 1 predicts the date and time when a customer visits a store on the basis of a record of the customer visiting the store and drop-in information of the customer. It is determined whether the predicted date and time of visit corresponds to a busy hours of the store. When it is determined that the date and time of visit of the customer corresponds to the busy hours, information of encouraging the customer to visit on another date and time is sent to the customer.

A model creation device disclosed in Patent Document 2 models a customer action using a level of awareness including awareness with presence of a service and awareness with a function of the service as a customer's level of awareness with the service. A prediction device predicts which service will a customer select using the customer's action model.

A technology for assisting customers in asset management based on investment in securities to realize smooth lending operations and sound management of financial institutions has been studied (for example, see Patent Document 3). In the technology disclosed in Patent Document 3, a financial institution server is provided with a deposit account DB that stores information on a deposit account of a customer opened in a financial institution and a depository receipt account DB that stores information on a depository receipt account of the customer opened in the financial institution in such a form that the financial institution borrows a depository receipt issued for securities stored and managed in a securities company from the customer. Trading distribution information is created in response to a trading order of the customer and is transmitted to a securities company server, and trading result information is received from a securities company server to update the balances of the deposit account DB and the depository receipt account DB.

A technology of supporting operations using machine learning or the like has been studied (for example, see Patent Document 4). In the technology disclosed in Patent Document 4, a receiving unit receives, from a contractor, a reply to a requested task and the grounds for determination. A type classification unit classifies the grounds for determination into classes based on the grounds for determination and the reply. A class extraction unit extracts a ground for determination belonging to a predetermined type on the basis of the classified types. A providing unit provides the extracted ground for determination.

PRIOR ART DOCUMENTS

Patent Documents

Patent Document 1: Japanese Laid-Open Patent Publication No. 2016-173649
Patent Document 2: Japanese Laid-Open Patent Publication No. 2005-352728
Patent Document 3: Japanese Laid-Open Patent Publication No. 2007-47940
Patent Document 4: Japanese Laid-Open Patent Publication No. 2016-177477

SUMMARY OF THE INVENTION

Problems that the Invention is to Solve

The technology disclosed in Patent Document 1 predicts the actions of each customer but does not predict a customer's action that contributes to overall management. The technology disclosed in Patent Document 2 does not take control of a customer's action in a bank into consideration. The technology disclosed in Patent Document 3 takes sound management of a financial institution into consideration but does not encourage a customer's action.

Means for Solving the Problems

Effects of the Invention

According to the present disclosure, it is possible to support execution of accurate and efficient banking operations.

MODES FOR CARRYING OUT THE INVENTION

First Embodiment

Hereinafter, an embodiment which substantiates a banking operation support system, a banking operation support method, and a banking operation support program will be described with reference to FIGS. 1 to 7. In the present embodiment, a case in which financial transaction conditions for services and instruments provided to customers of a bank (a financial institution) are controlled in order to realize an accurate balance sheet of the bank will be considered.

Figure 1:
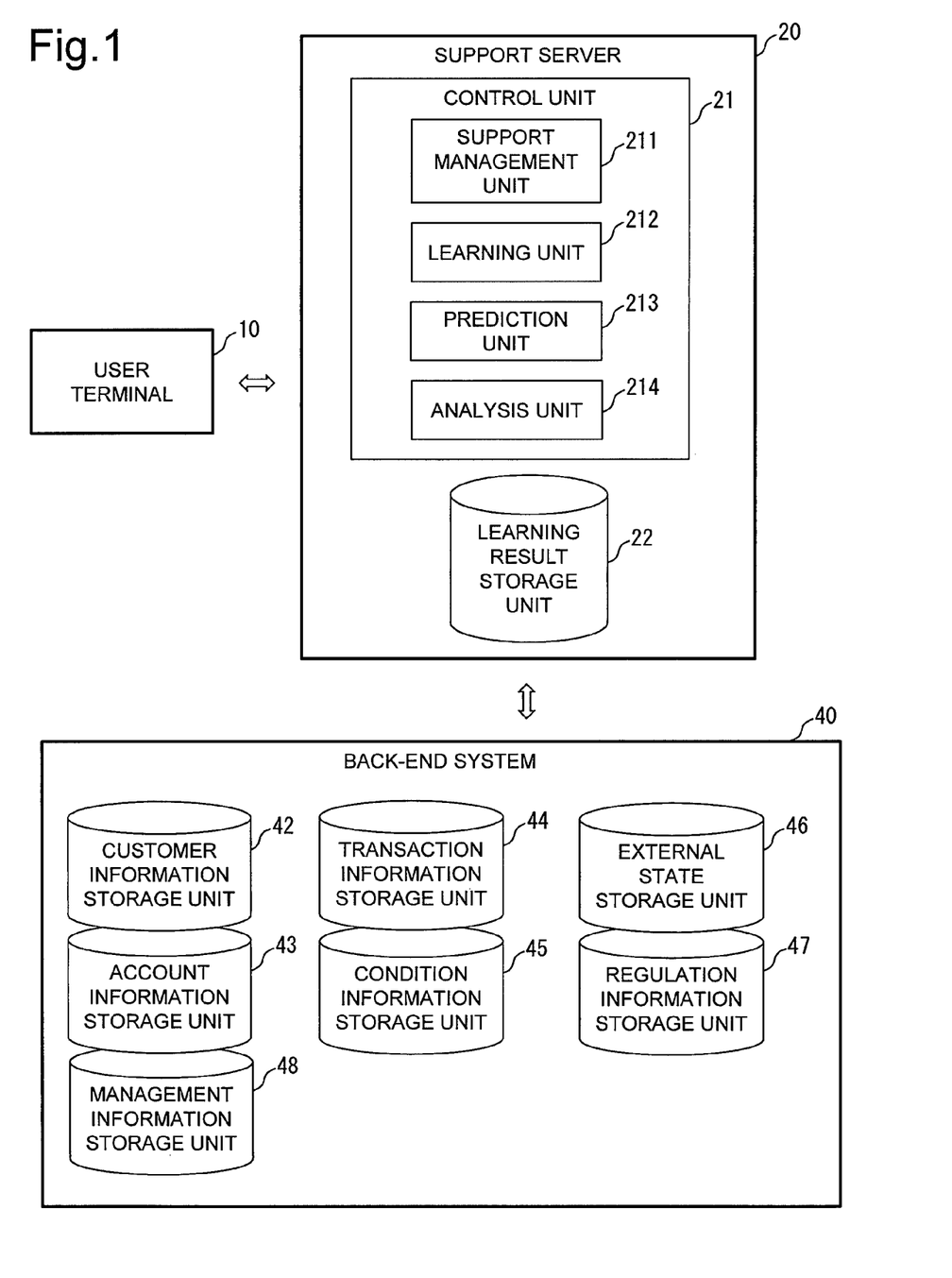
FIG. 1 is a diagram illustrating a banking operation support system according to the present embodiment.

In this embodiment, as illustrated in FIG. 1, a banking operation system including a user terminal 10, a support server 20, and a back-end system 40 (an operation system) is used.

Figure 5:
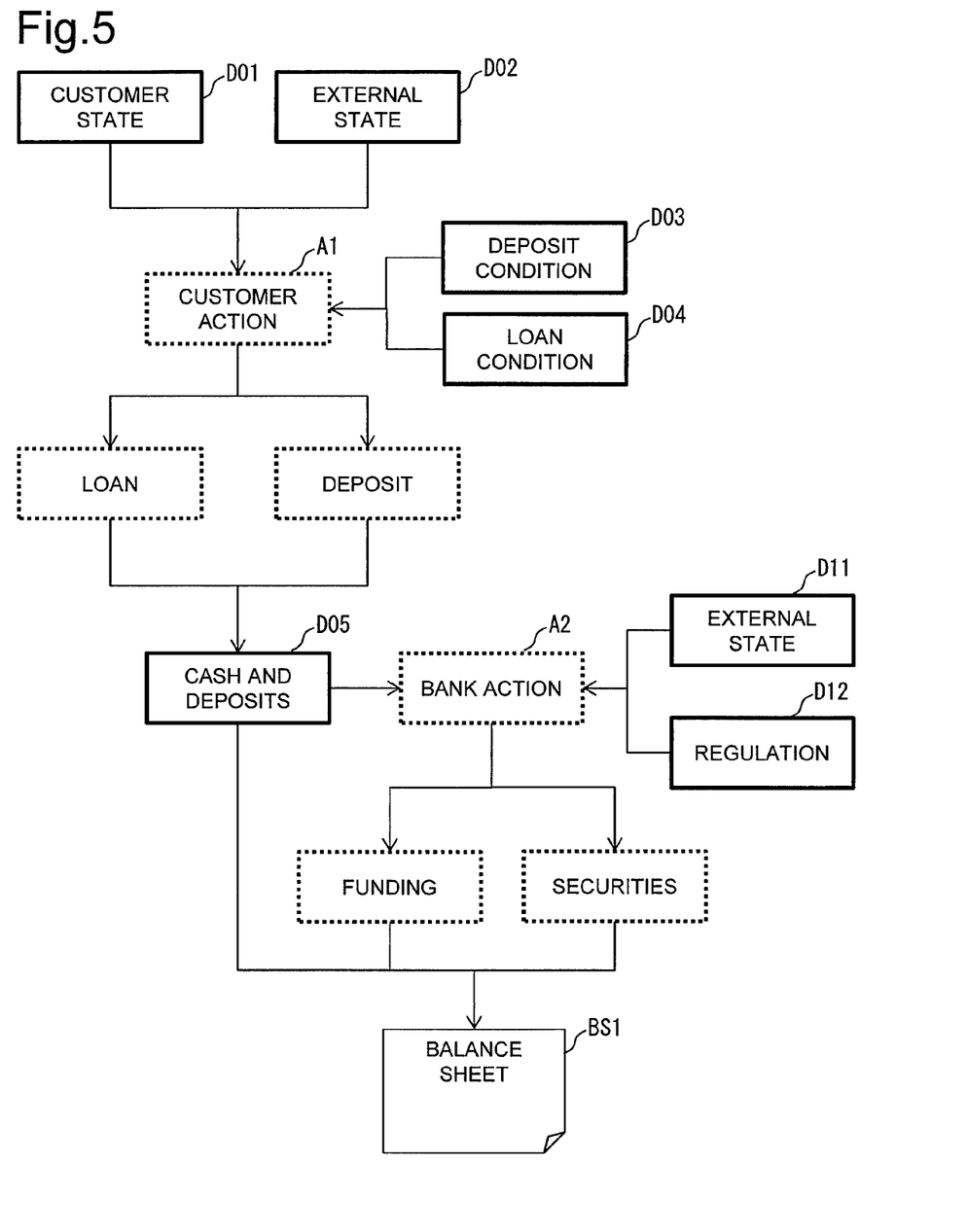
FIG. 5 is a diagram illustrating a relationship between a customer action and a bank action according to the present embodiment.

First, a concept of the present embodiment will be described with reference to FIG. 5. A case in which a customer action A1 is predicted using machine learning will be considered. The customer action A1 includes depositing of funds in a bank and borrowing of funds from a bank. The customer action A1 depends on a customer state D01 corresponding to a segment to which a customer attribute belongs and an external state D02 such as prices and market conditions. In this case, a bank can encourage the customer action A1 by controlling deposit conditions D03 and loan conditions D04 as financial transaction conditions. Cash and deposits D05 of a bank is determined by debt (loans) and deposits based on the customer action A01.

A bank action A2 is performed according to the cash and deposits D05. The bank action A2 includes funding and investments. In the present embodiment, purchase of securities is considered as an example of investments. The bank action A2 depends on an external state D11 such as market conditions and an interbank interest rate and regulations D12 such as requirements.

A balance sheet BS1 of a bank is determined on the basis of the cash and deposits D05, funding, and investments.

Figure 6:
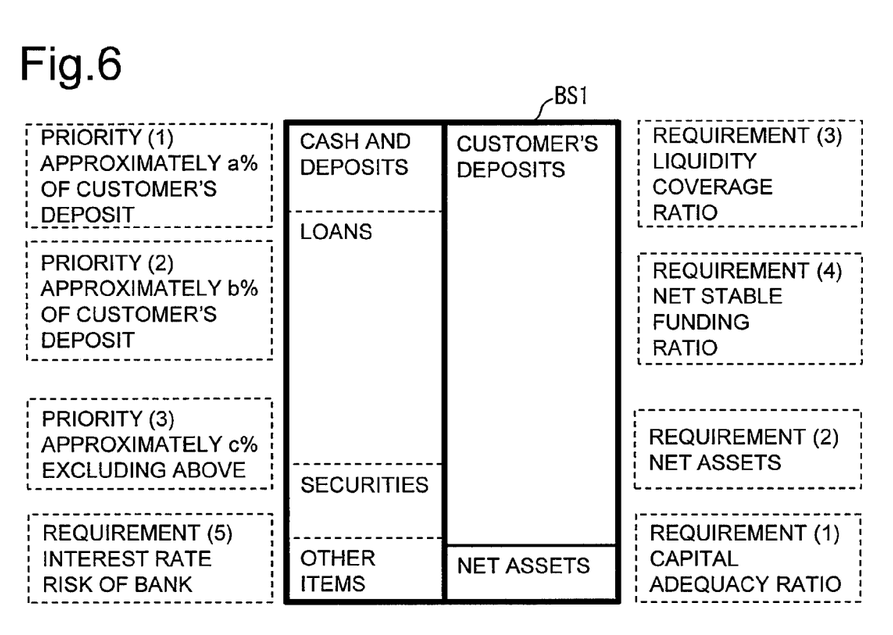
FIG. 6 is a diagram illustrating a balance sheet according to the present embodiment.

Next, the balance sheet BS1 of a bank will be described with reference to FIG. 6. The balance sheet BS1 includes cash and deposits, loans, securities, and other items as the debit side. Moreover, the balance sheet BS1 includes the respective items of customer's deposits and net assets as the credit side. In this case, each of items that form the balance sheet BS1 has a priority and a requirement.

For example, Priority (1) is that "cash and deposits are a % (for example, approximately 20%) of customer's deposits". Although the cash and deposits is a preparation for withdrawal of customer's deposits, since profitability is low, the proportion of the cash and deposits is preferably small.

Priority (2) is that "loans and securities are b % (for example, approximately 70%) of customer's deposits". Although loans and securities are highly profitable, since there is a credit risk, the capital adequacy ratio decreases. Therefore, it is necessary to control the amount of money using a lending rate and a lending period.

Priority (3) is that "securities are c % (for example, approximately 10%) excluding Priorities (1) and (2)". Although securities are superior to loans in profitability, there is little credit risk if they are national bonds. Therefore, the securities are operated as surplus funds of the cash and deposits.

Requirement (1) is a regulation on "capital adequacy ratio". The capital adequacy ratio regulation is a ratio of a bank's capital to a risk asset and is a regulation that the proportion of Tier 1 capital such as common stocks is approximately 10%.

Requirement (2) is a regulation on "net assets". Net assets are approximately 10%, for example, of total assets. The net assets are used as a buffer in the event of losses.

Requirement (3) is a regulation on "liquidity coverage ratio". The liquidity coverage ratio refers to procuring highly liquid assets to cope with funds flowing out over a 30-day stress period.

Requirement (4) is a regulation on "net stable funding ratio". The net stable funding ratio refers to procuring stable funding in mid-to-long terms against assets that are difficult to sell in a short term.

Requirement (5) relates to "IRRBB (interest rate risk in the banking book)". Specifically, the loss of an interest rate risk (for example, in the event of an interest rate rise of 200 bp in US dollars and Euro and 100 bp in Japan Yen) is limited to 15% of Tier 1 capital.

The user terminal 10 is a computer terminal used by a responsible person in a bank.

The support server 20 includes a control unit 21 and a learning result storage unit 22. The control unit 21 includes a support management unit 211, a learning unit 212, a prediction unit 213, and an analysis unit 214.

The support management unit 211 executes a process of supporting operations of a banking operation. Specifically, the support management unit 211 acquires various pieces of information from the back-end system 40 and provides the same to the learning unit 212 and the prediction unit 213. Furthermore, the prediction unit 213 acquires prediction results and outputs the same to the user terminal 10. Moreover, the support management unit 211 stores a condition candidate list. Data related to a plurality of deposit condition candidates and a plurality of loan condition candidates to be used for a supporting process is recorded in the condition candidate list.

The learning unit 212 executes a process of performing machine learning using learning data composed of variables that form an input layer and an output layer and generating a prediction model. The learning unit 212 generates a prediction model to be used for prediction from various pieces of information according to multivariate analysis, machine learning, deep learning, and the like.

The prediction unit 213 executes a process of predicting various variables using the prediction model generated by the learning unit 212.

The analysis unit 214 executes a process of predicting an action that maximizes the profits among management activities of a company. The analysis unit 214 stores data related to a reference proportion for evaluating cash and deposits. Furthermore, the analysis unit 214 executes an investment simulation and a funding simulation according to cash and deposits and a current balance of customer's deposits. The investment and funding simulations are performed by taking the above-mentioned regulations (priorities and requirements) into consideration.

The investment simulation involves purchasing securities using surplus cash and deposits. For example, the profits or losses are predicted when national bonds are purchased using a current surplus balance.

The funding simulation involves procuring cash using deficient cash and deposits. For example, the profits or losses are predicted when cash is procured using a current surplus balance by taking advantage of the interbank interest rate.

Prediction model data for predicting a customer's action is stored in the learning result storage unit 22. The prediction model data is recorded when learning is performed on the basis of a customer state, an external state, and an interest rate. Prediction model data of a customer is stored in the learning result storage unit 22.

The back-end system 40 functions as an information storage system. Therefore, the back-end system 40 includes a customer information storage unit 42, an account information storage unit 43, a transaction information storage unit 44, a condition information storage unit 45, an external state storage unit 46, a regulation information storage unit 47, and a management information storage unit 48.

Figure 3A:
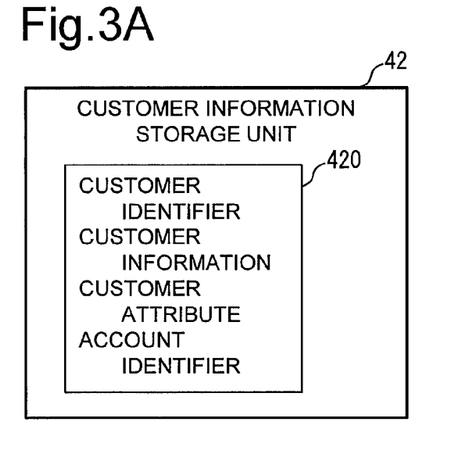
FIG. 3A is a diagram illustrating an information storage unit according to the present embodiment and illustrates a customer information storage unit.

As illustrated in FIG. 3A, customer management records on customers of a bank are recorded in the customer information storage unit 42. The customer management record is registered when a customer opens a bank account and is updated when the account is changed, for example. Data related to a customer identifier such as a customer number, customer information, a customer attribute, and an account identifier is recorded in the customer management record.

Data related to identifiers for specifying respective customers of a bank is recorded in a customer identifier data area.

Data related to personal information (a name, an account identifier, contact information, an address, and the like) is recorded in a customer information data area.

Data related to attributes (an age, a gender, an occupation, and the like) of the customer is recorded in a customer attribute data area. A segment to which the customer belongs is determined by the customer attribute. The customer attribute is stored in association with the time of registration or the time of change.

Data related to an identifier (a head office code, a type code, and an account number) for specifying accounts held by the customer is recorded in an account identifier data area.

Figure 3B:
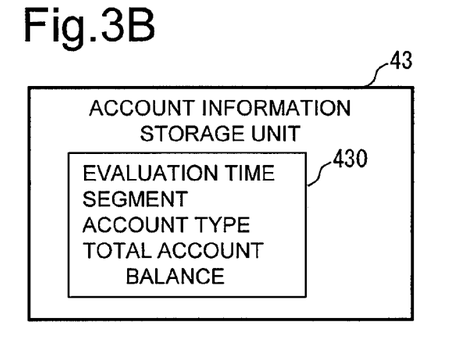
FIG. 3B is a diagram illustrating an information storage unit of the present invention and illustrates an account information storage unit.

As illustrated in FIG. 3B, an account management record 430 related to a savings account opened in a bank is recorded in the account information storage unit 43. The account management record 430 is recorded when balance conditions of accounts opened in a bank are evaluated statistically. Data related to the time of evaluation, a segment, an account type, and a total account balance is recorded in the account management record 430.

Data related to the time (date) when accounts opened in a bank were evaluated is recorded in an evaluation time data area.

Data related to identifiers for specifying segments of customer attributes is recorded in a segment data area.

Data related to identifiers for specifying account types (for example, an ordinary deposit, a fixed deposit, and the like) is recorded in an account type data area.

Data related to the total of balances of all account types held by a customer belonging to the segment is recorded in a total account balance data area.

Figure 3C:
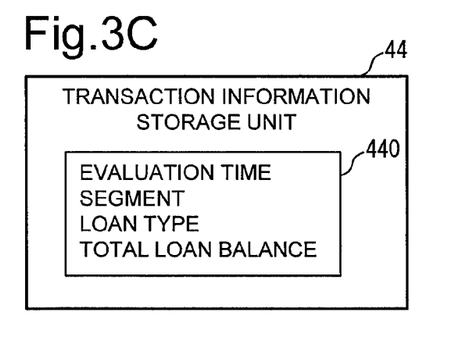
FIG. 3C is a diagram illustrating an information storage unit according to the present embodiment and illustrates a transaction information storage unit.

As illustrated in FIG. 3C, a transaction management record 440 related to translations (in the present embodiment, loans) with a customer is recorded in the transaction information storage unit 44. The transaction management record is recorded when transaction states with the customer are evaluated statistically. Data related to the time of evaluation, a segment, a loan type, and a total loan balance is recorded in the transaction management record.

Data related to the time (date) when loans were evaluated in a bank is recorded in an evaluation time data area.

Data related to identifiers for specifying segments of customer attributes is recorded in a segment data area.

Data related to identifiers for specifying loan types (for example, a housing loan, a card loan, and the like) is recorded in a loan type data area.

Data related to the total of balances of all loan types of a customer belonging to the segment is recorded in a total loan balance data area.

Figure 3D:
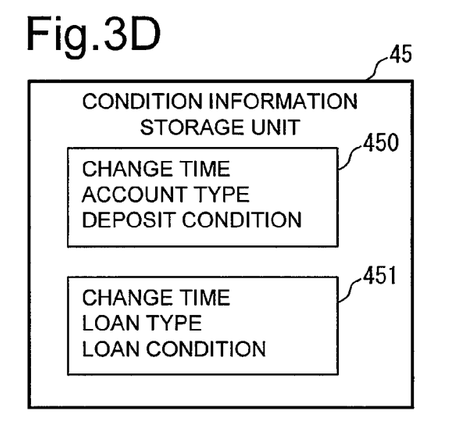
FIG. 3D is a diagram illustrating an information storage unit according to the present embodiment and illustrates a condition information storage unit.

As illustrated in FIG. 3D, a deposit condition management record 450 and a loan condition management record 451 are recorded in the condition information storage unit 45. The deposit condition management record 450 and the loan condition management record 451 are recorded when financial transaction conditions (deposit conditions and loan conditions) provided to a customer are determined.

Data related to the time of change, an account type, and deposit conditions is recorded in the deposit condition management record 450.

Data related to the date when deposit conditions are changed is recorded in a change time data area.

Data related to identifiers for specifying account types is recorded in an account type data area.

Data related to changed deposit conditions (a deposit rate and a deposit period) is recorded in a deposit condition data area.

Data related to the time of change, a loan type, and loan conditions is recorded in the loan condition management record 451.

Data related to the date when loan conditions are changed is recorded in a change time data area.

Data related to identifier for specifying loan types is recorded in a loan type data area. Here, a loan type corresponding to a segment or a credit score of a customer who borrows money may be recorded in the loan type data area.

Data related to changed loan conditions (an interest rate and a loan period) is recorded in a loan condition data area.

Figure 4A:
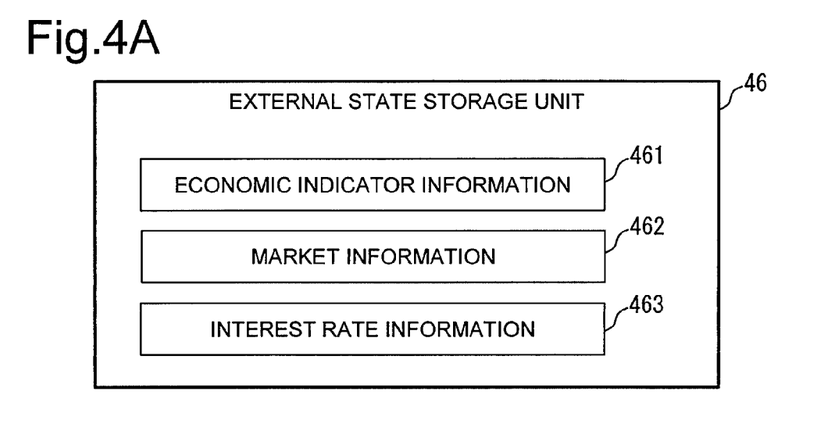
FIG. 4A is a diagram illustrating an information storage unit according to the present embodiment and illustrates an external state storage unit.

As illustrated in FIG. 4A, data related to various external states is recorded in the external state storage unit 46. In the present embodiment, economic indicator information 461, market information 462, and interest rate information 463 are used as the external state information.

Information related to economic indicators is recorded in the economic indicator information 461 in association with the time (date) when economic indicator information was acquired. Information on GDP and prices, for example, can be used as the economic indicator.

Market information is recorded in the market information 462 in association with the time (date) when the market information was acquired. Index information related to national bonds (domestic bonds and foreign bonds), exchange rates, and the like, for example, can be used as the market information.

Interest rate information is recorded in the interest rate information 463 in association with the time (date) when the interest rate information was acquired. Host bank interest rate, foreign interest rates, other bank interest rates, an interbank interest rate, and the like, for example, can be used as the interest rate information.

Figure 4B:
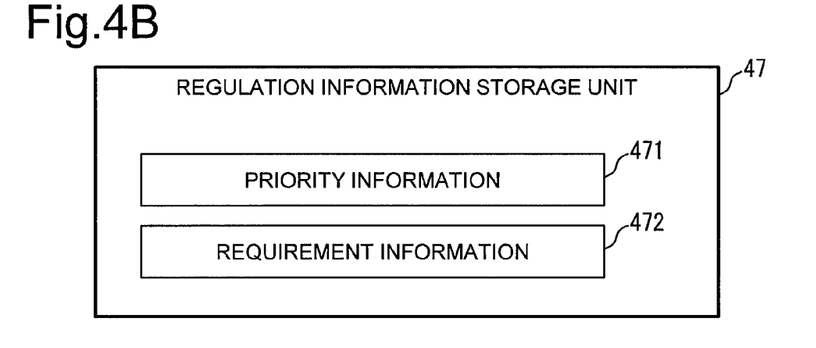
FIG. 4B is a diagram illustrating an information storage unit according to the present embodiment and illustrates a regulation information storage unit.

As illustrated in FIG. 4B, regulation information on various regulations is recorded in the regulation information storage unit 47. The regulation information is recorded when regulations are registered by a responsible person.

Information on regulations (priorities, requirements, and the like) (that is, priority information 471 and requirement information 472) is recorded in the regulation information in association with the time (date) when regulations were set.

Figure 4C:
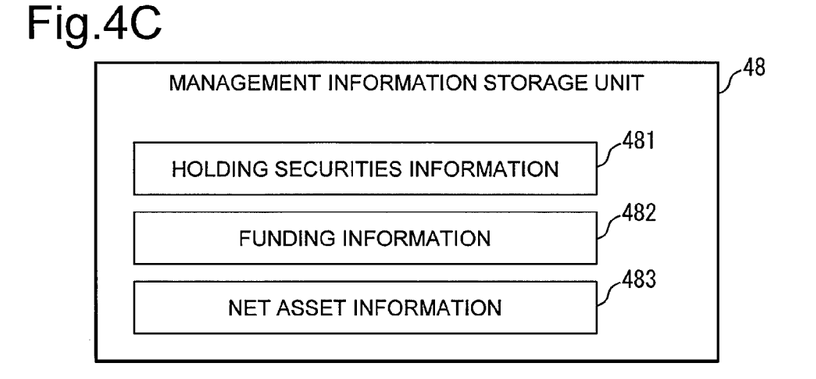
FIG. 4C is a diagram illustrating an information storage unit according to the present embodiment and illustrates a management information storage unit.

As illustrated in FIG. 4C, various pieces of information on respective elements that form a balance sheet that describing a management state of a bank are recorded in the management information storage unit 48. In the present embodiment, holding securities information 481, funding information 482, and net asset information 483 are recorded.

Information on securities (stocks, quantities, prices) held by a bank is recorded in the holding securities information 481.

Information on funds (suppliers and amounts) procured by a bank is recorded in the funding information 482.

Information on net assets (asset details and prices) held by a bank is recorded in the net asset information 483.

Hardware Configuration Example

Figure 2:
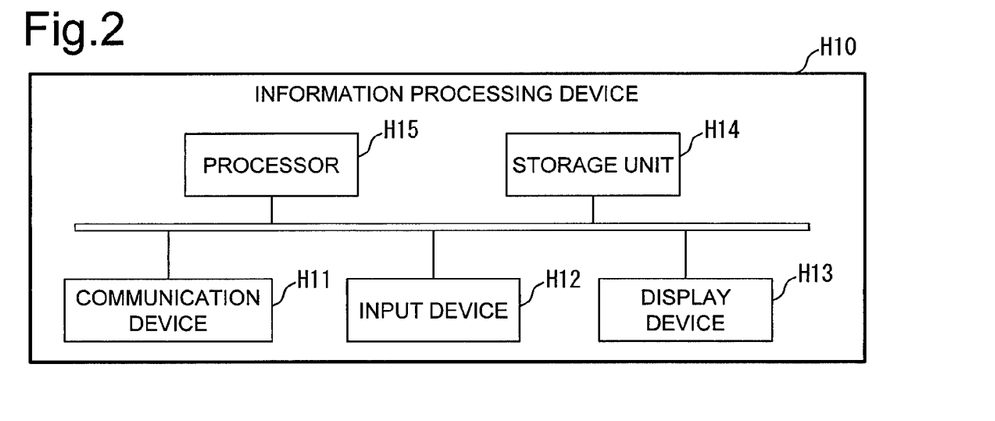
FIG. 2 is a diagram illustrating a hardware configuration example.

FIG. 2 illustrates a hardware configuration example of an information processing device H10 that functions as the user terminal 10, the back-end system 40, and the like.

The information processing device H10 includes a communication device H11, an input device H12, a display device H13, a storage unit H14, and a processor H15. The hardware configuration is an example, and the information processing device may include other hardware components.

The communication device H11 is an interface that establishes a communication path with other devices to execute transmission and reception of data and is a network interface card, a wireless interface, or the like, for example.

The input device H12 is a device that receives the input from a user and the like and is a mouse, a keyboard, or the like, for example.

The display device H13 is a display, a touch panel, or the like that displays various pieces of information.

The storage unit H14 is a non-transitory computer-readable medium or a storage device (for example, the learning result storage unit 22, the preparation information storage unit 23, the customer information storage unit 42, the management information storage unit 49, and the like) that stores various programs and data for executing various functions of the user terminal 10 and the back-end system 40, and the like. An example of the storage unit H14 includes a ROM, a RAM, a hard disk, and the like.

The processor H15 controls respective processes of the user terminal 10, the back-end system 40, and the like using the programs and data stored in the storage unit H14. An example of the processor H15 includes a CPU, an MPU, and the like. The processor H15 deploys a program stored in the ROM and the like into the RAM and executes various processes corresponding to various processes. For example, when a banking operation support program is activated, the processor H15 operates a process for executing respective processes illustrated in FIG. 7 to be described later.

Supporting Process

A supporting process will be described with reference to FIGS. 7 and 8.

Figure 7:
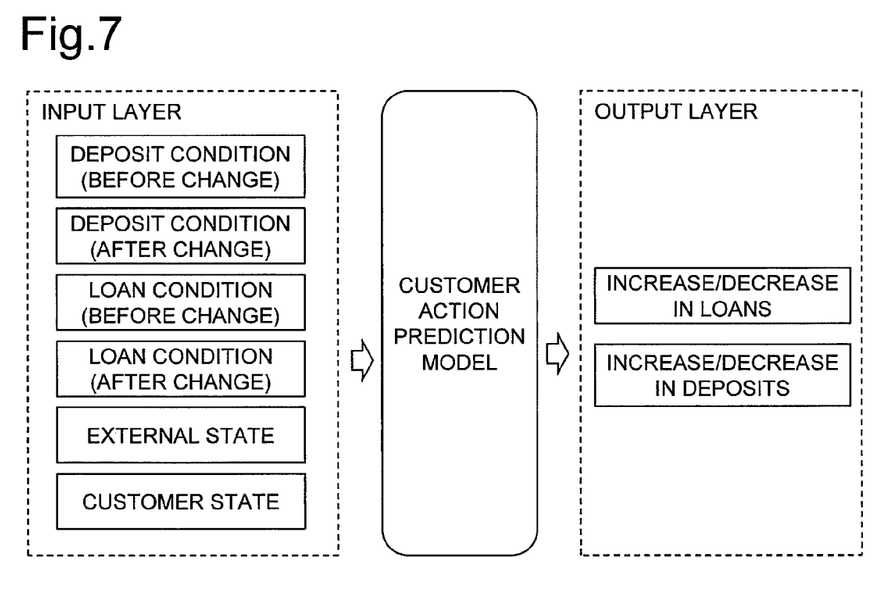
FIG. 7 is a diagram illustrating a customer action model according to the present embodiment.

In this example, as illustrated in FIG. 7, a customer action prediction model for predicting increase/decrease in loans and increase/decrease in deposits is calculated from deposit conditions (before/after change), loan conditions (before/after change), external states, and customer states.

Figure 8:
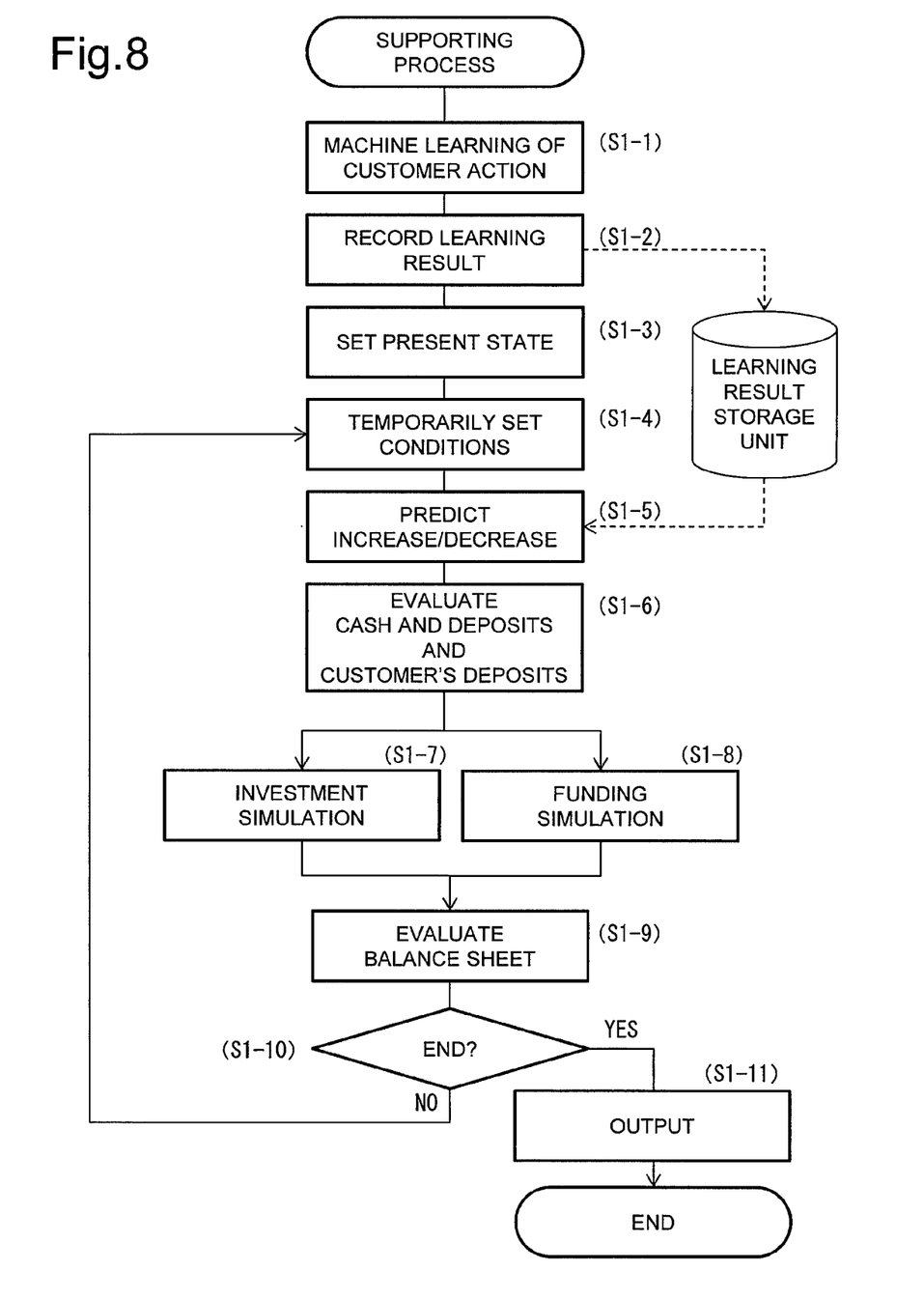
FIG. 8 is a diagram illustrating a processing procedure according to another embodiment.

As illustrated in FIG. 8, the control unit 21 of the support server 20 executes a customer action machine learning process (step S1-1). Specifically, the support management unit 211 of the control unit 21 specifies the date (an interest rate change time) when a deposit rate or a lending rate is changed from the condition information storage unit 45 as an evaluation time. The support management unit 211 acquires the deposit conditions and the loan conditions before and after the interest rate change time from the condition information storage unit 45. Subsequently, the support management unit 211 acquires the external state information at the evaluation time from the external state storage unit 46. In this example, economic indicator information 461, market information 462, and interest rate information 463 are acquired as the external states. Furthermore, the support management unit 211 acquires customer attributes (segments) recorded in the customer management record 420 at the evaluation time from the customer information storage unit 42 and calculates a distribution of the customer attributes as the customer states. Subsequently, the support management unit 211 acquires the total account balance recorded in the account information storage unit 43 and the total loan balance recorded in the transaction information storage unit 44 before and after the evaluation time. The support management unit 211 calculates an increase/decrease (amount of money) in deposits by subtracting the total account balance before the evaluation time from the total account balance after the evaluation time. Furthermore, the support management unit 211 calculates an increase/decrease (amount of money) in loans by subtracting the total loan balance before the evaluation time from the total loan balance after the evaluation time.

The support management unit 211 creates a data set (learning data) made up of the deposit conditions (before and after evaluation time), the loan conditions (before and after evaluation time), the external states, the customer states, the increase/decrease in loans, and the increase/decrease in deposits every evaluation time. Subsequently, the learning unit 212 calculates a customer action prediction model by performing machine learning using the deposit conditions, the customer states, and the like as an input layer and using the increase/decrease in loans and the increase/decrease in deposits as an output layer.

Subsequently, the control unit 21 of the support server 20 executes a learning result recording process (step S1-2). Specifically, the learning unit 212 of the control unit 21 records the generated customer action prediction model in the learning result storage unit 22.

Subsequently, the control unit 21 of the support server 20 executes a current condition setting process (step S1-3). Specifically, the support management unit 211 of the control unit 21 acquires the current external states from the external state storage unit 46. Furthermore, the support management unit 211 acquires the customer attributes (segments) recorded in the current customer management record 420 from the customer information storage unit 42 and calculates a distribution of the customer attributes as customer states. The prediction unit 213 sets the current external states and the current customer states to the input layer of the customer action prediction model.

Subsequently, the control unit 21 of the support server 20 executes a temporary condition setting process (step S1-4). Specifically, the support management unit 211 of the control unit 21 acquires new deposit condition candidates and new loan condition candidates for the current deposit conditions and the current loan conditions from a condition candidate list. The prediction unit 213 sets the current deposit conditions and loan conditions and the acquired deposit condition candidates and loan condition candidates to the input layer of the customer action prediction model.

Subsequently, the control unit 21 of the support server 20 executes an increase/decrease prediction process (step S1-5). Specifically, the prediction unit 213 of the control unit 21 calculates an increase/decrease in deposits and an increase/decrease in loans of the output layer using the customer action prediction model.

Subsequently, the control unit 21 of the support server 20 executes a process of evaluating a cash and deposits and a customer's deposits (step S1-6). Specifically, the support management unit 211 of the control unit 21 updates the balance of the cash and deposits and the current customer's deposits on the basis of the increase/decrease in deposits and the increase/decrease in loans calculated by the prediction unit 213. The analysis unit 214 calculates the proportion of the cash and deposits to the customer's deposits and compares the same with a reference proportion.

Here, when the proportion of the cash and deposits is equal to or higher than the reference proportion, the control unit 21 of the support server 20 executes an investment simulation process (step S1-7). Specifically, the analysis unit 214 of the control unit 21 acquires information on securities that can be purchased from an external site and calculates funds when investment was executed. In this case, an investment value is calculated so as to meet various regulations (priorities and requirements) recorded in the regulation information storage unit 47.

On the other hand, when the proportion of the cash and deposits is smaller than the reference proportion, the control unit 21 of the support server 20 executes a funding simulation process (step S1-8). Specifically, the analysis unit 214 of the control unit 21 acquires information on funding available from an external site and calculates funds when funding was executed. In this case, the funding simulation is performed so as to meet various regulations (priorities and requirements) recorded in the regulation information storage unit 47.

Subsequently, the control unit 21 of the support server 20 executes a balance sheet evaluation process (step S1-9). Specifically, the support management unit 211 of the control unit 21 applies a simulation result to the balance sheet. Furthermore, the support management unit 211 sets various pieces of information recorded in the management information storage unit 48 to the balance sheet. Subsequently, the support management unit 211 applies the simulation results obtained in the investment simulation process (step S1-7) and the funding simulation process (step S1-8) to the balance sheet. The support management unit 211 temporarily stores the calculated balance sheet in association with the deposit conditions and the loan conditions.

Subsequently, the control unit 21 of the support server 20 executes a process of determining whether the evaluation process is to be ended (step S1-10). Specifically, when it is determined in the temporary condition setting process (step S1-4) that all deposit condition candidates and all loan condition candidates recorded in the condition candidate list are used, the support management unit 211 of the control unit 21 determines that the evaluation process is to be ended. On the other hand, when a deposit condition candidate or a loan condition candidate which has not been used remains in the condition candidate list, it is determined that the evaluation process is not to be ended.

When it is determined that the evaluation process is not to be ended (step S1-10: "NO"), the control unit 21 of the support server 20 repeats the processes subsequent to the temporary condition setting process (step S1-4).

When it is determined that the evaluation process is to be ended (step S1-10: "YES"), the control unit 21 of the support server 20 executes an output process (step S1-11). Specifically, the support management unit 211 of the control unit 21 specifies a balance sheet that meets the priorities and the requirements among balance sheets stored temporarily and outputs the deposit conditions and the loan conditions corresponding to the specified balance sheet to the user terminal 10. Financial transaction conditions that provide a target value (the maximum profit) are specified using the output balance sheet.

According to the present embodiment, the following effects can be obtained.

(1-1) In the present embodiment, the control unit 21 of the support server 20 executes a customer action machine learning process (step S1-1). A data set (learning data) made up of the deposit conditions, the loan conditions, the external states, the customer states, the increase/decrease in loans, and the increase/decrease in deposits is created every evaluation time. Subsequently, the learning unit 212 calculates a customer action prediction model by performing machine learning using the deposit conditions, the customer states, and the like as an input layer and using the increase/decrease in loans and the increase/decrease in deposits as an output layer. In this way, using the deposit conditions the loan conditions as the input layer, it is possible to predict the increase/decrease in loans and the increase/decrease in deposits when the financial transaction conditions are changed.

Using the external states as the input layer, it is possible to predict the increase/decrease in loans and the increase/decrease in deposits by taking the external states into consideration.

Using the customer states as the input layer, it is possible to predict the increase/decrease in loans and the increase/decrease in deposits by taking the customer states into consideration.

(1-2) In the present embodiment, the control unit 21 of the support server 20 executes the temporary condition setting process (step S1-4) and the increase/decrease prediction process (step S1-5). In this way, it is possible to predict increase/decrease in deposits and loans using financial transaction condition candidates.

(1-3) In the present embodiment, the control unit 21 of the support server 20 executes the process of evaluating cash and deposits and customer's deposits (step S1-6). When the proportion of the cash and deposits is high, the control unit 21 of the support server 20 executes the investment simulation process (step S1-7). On the other hand, when the proportion of the cash and deposits is low, the control unit 21 of the support server 20 executes the funding simulation process (step S1-8). In this way, it is possible to maintain an appropriate balance of the cash and deposits.

In this case, simulation is performed so as to meet various regulations (priorities and requirements) recorded in the regulation information storage unit 47. In this way, it is possible to perform simulation by taking priorities in management and regulations in banks into consideration.

(1-4) In the present embodiment, the control unit 21 of the support server 20 executes the balance sheet evaluation process (step S1-9) and the output process (step S1-11). In this way, it is possible to evaluate the influence on a balance sheet when financial transaction conditions are changed.

Second Embodiment

Next, a second embodiment which substantiates a banking operation support system, a banking operation support method, and a banking operation support program will be described with reference to FIGS. 9 and 10. Since the second embodiment has a configuration which changes only the customer action prediction method of the first embodiment, the detailed description of similar portions will be omitted. In the first embodiment, a customer action prediction model is calculated by performing machine learning using the deposit conditions, the customer states, and the like as an input layer and the increase/decrease in loans and the increase/decrease in deposits as an output layer.

Figure 9:
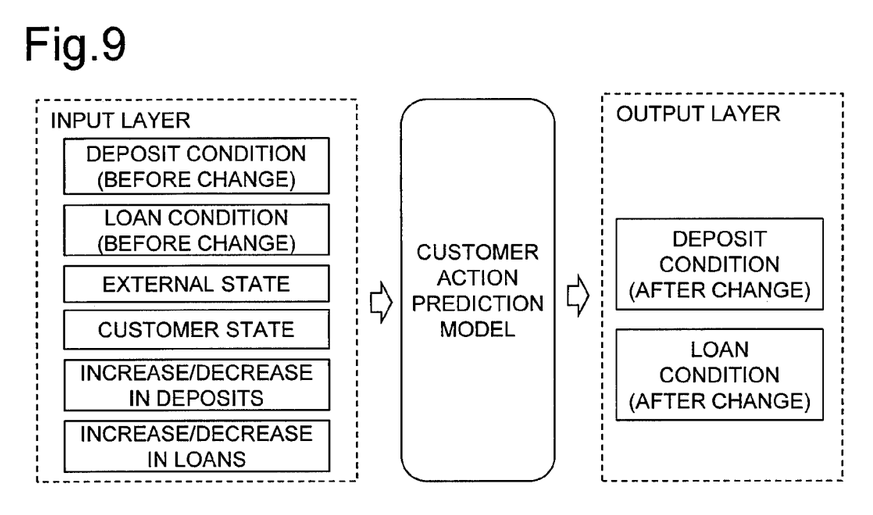
FIG. 9 is a diagram illustrating a customer action model according to another embodiment.

In the second embodiment, as illustrated in FIG. 9, a customer action prediction model for predicting deposit conditions (after change) and loan conditions (after change) for obtaining a target increase/decrease in loans and a target increase/decrease in deposits under deposit conditions (before change), loan conditions (before change), external states, and customer states is calculated.

Figure 10:
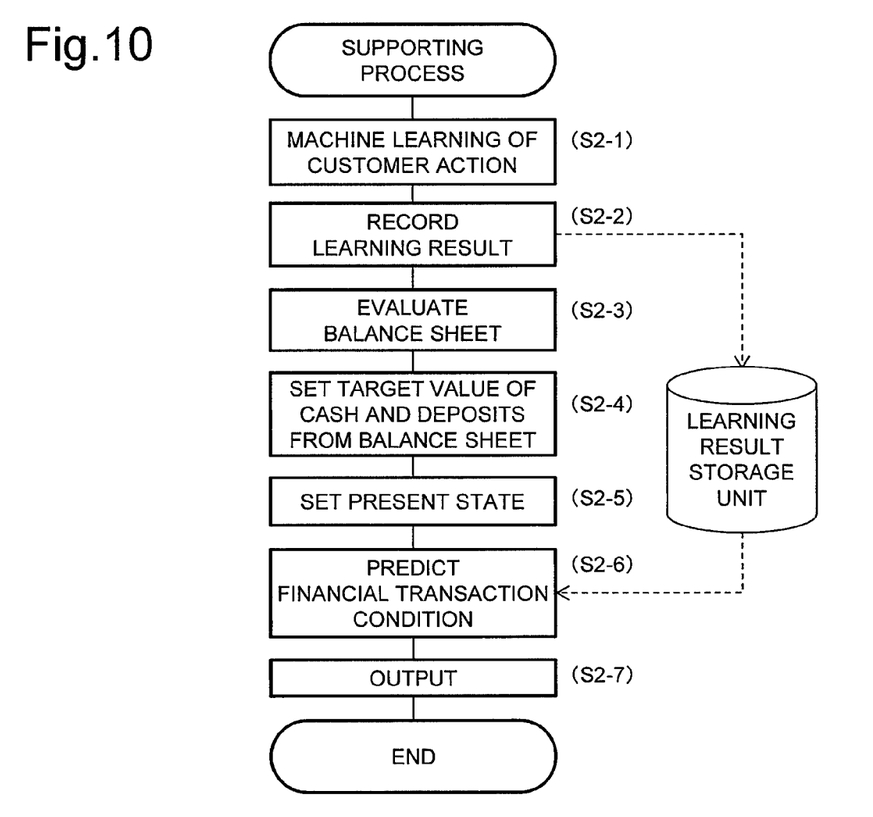
FIG. 10 is a diagram illustrating a processing procedure according to another embodiment.

As illustrated in FIG. 10, the control unit 21 of the support server 20 executes a customer action machine learning process (step S2-1). Specifically, the support management unit 211 of the control unit 21 creates a data set (learning data) made up of deposit conditions, loan conditions, external states, customer states, an increase/decrease in loans, and an increase/decrease in deposits on the basis of the information acquired every evaluation time from the back-end system 40 similarly to step S1-1. Subsequently, the learning unit 212 calculates a customer action prediction model by performing machine learning using the deposit conditions (before change), the loan conditions (before change), the increase/decrease in loans, the increase/decrease in deposits, the external states, and the customer states as an input layer and the deposit conditions (after change) and the loan conditions (after change) as an output layer.

First, the control unit 21 of the support server 20 executes a learning result recording process similarly to step S1-2 (step S2-2).

Subsequently, the control unit 21 of the support server 20 executes a balance sheet evaluation process (step S2-3). Specifically, the analysis unit 214 of the control unit 21 acquires various pieces of information from the management information storage unit 48 and inputs the acquired information to the balance sheet. Subsequently, the analysis unit 214 adjusts respective items of the balance sheet with a predetermined variation width and creates a targeting balance sheet (a target balance sheet). The target balance sheet is a balance sheet which maximizes the profits while meeting the priorities and the requirements recorded in the regulation information storage unit 47, for example.

Subsequently, the control unit 21 of the support server 20 executes a process of setting a target amount of the cash and deposits from the balance sheet (step S2-4). Specifically, the analysis unit 214 of the control unit 21 calculates the increase/decrease in deposits from the difference between the customer's deposits in the target balance sheet and the customer's deposits in the current balance sheet. Furthermore, the analysis unit 214 calculates the increase/decrease in loans from the difference between the loans in the target balance sheet and the loans in the current balance sheet.

Subsequently, the control unit 21 of the support server 20 executes a current condition setting process similarly to step S1-3 (step S2-5).

Subsequently, the control unit 21 of the support server 20 executes a financial transaction condition prediction process (step S2-6). Specifically, the prediction unit 213 of the control unit 21 inputs the increase/decrease in deposits and the increase/decrease in loans calculated in step S2-4 to the customer action prediction model. The prediction unit 213 calculates the deposit conditions and the loan conditions using the customer action prediction model.

Subsequently, the control unit 21 of the support server 20 executes an output process (step S2-7). Specifically, the support management unit 211 of the control unit 21 outputs the calculated deposit conditions (after change) and loan conditions (after change) to the user terminal 10.

According to the present embodiment, the following effects can be obtained.

(2-1) In the present embodiment, the control unit 21 of the support server 20 executes a customer action machine learning process (step S2-1). In this example, the learning unit 212 calculates a customer action prediction model by performing machine learning using the deposit conditions (before change), the loan conditions (before change), the increase/decrease in loans, the increase/decrease in deposits, the external states, and the customer states as an input layer and the deposit conditions (after change) and the loan conditions (after change) as an output layer. In this way, it is possible to predict financial transaction conditions for realizing the target balance sheet.

The present embodiment can be modified and implemented in the following manner. The present embodiment and the modifications below can be implemented in combinations in a range where technical contradiction does not occur.

In the first embodiment, an optimized balance sheet is retrieved by changing the deposit conditions and the loan conditions. Instead of this, a bank action for calculating a better balance sheet may be predicted by machine learning. In this case, a bank action prediction model which associates a bank action pattern (funding or investment) with a balance sheet is generated using learning data including respective evaluation results of external state information of banks, cash and deposits, the bank action pattern, and a balance sheet. Moreover, the bank action prediction model may be generated using financial transaction regulation information as an input layer.

In the above-described embodiments, financial transactions (deposits and loans) as customer actions are predicted using the financial transaction conditions. The financial transactions are not limited to deposits and loans, but either one may be combined with another transaction. For example, the customer action may be predicted using instruments and services provided by a bank. In this case, a service information storage unit and an instrument information storage unit are provided in the back-end system 40, and history information related to provision conditions and states of services and instruments is recorded. Machine learning is performed using a data set made up of provision conditions and states of services and instruments as learning data to calculate the customer action model.

In the above-described embodiments, learning data is created using information on a host bank. In addition to this, machine learning may be performed using information on other banks as well as the information on the host bank. Information that cannot be obtained from other banks is complemented using information on the host bank. For example, as for customer information, the position information of a branch office of the other bank is acquired, and the customer information of a branch office of the host bank present near the branch office of the other bank is used as the customer information.

In the above-described embodiments, the external state information is recorded in the back-end system 40. The external state information may be acquired from an external system such as an information providing site or the like.

In the above-described embodiments, the user terminal 10, the support server 20, and the back-end system 40 are used. A hardware configuration is not limited thereto. For example, these components may be integrated with each other.

The control unit 21 is not limited to performing software processing for all processes executed by itself. For example, the control unit 21 may include a dedicated hardware circuit (for example, an application specific integrated circuit (ASIC)) that performs hardware processing for at least some of the processes executed by itself. That is, the control unit 21 may be configured as a circuitry including: 1) one or more processors that operate according to a computer program (software); 2) one or more dedicated hardware circuits that execute at least some of various processes; and 3) a combination thereof. The processor includes a CPU and memory such as RAM and ROM, and the memory stores program codes or commands configured to cause the CPU to execute processes. The memory (that is, a computer-readable medium) includes all media that can be accessed using general-purpose or dedicated computers.

DESCRIPTION OF THE REFERENCE NUMERALS

10 User terminal
20 Support server
21 Control unit
22 Learning result storage unit
211 Support management unit
212 Learning unit
213 Prediction unit
214 Analysis unit
40 Back-end system
42 Customer information storage unit
43 Account information storage unit
44 Transaction information storage unit
45 Condition information storage unit
46 External state storage unit
47 Regulation information storage unit
48 Management information storage unit

What is claimed is:

1. A banking operation support system comprising:
   an information storage system that stores, for a plurality of evaluation times, a financial transaction condition of a financial transaction for each evaluation time of the plurality of evaluation times, customer state information for each evaluation time, history information including financial transaction state with a customer for each evaluation time, and external state information for each evaluation time; and
   a control unit connected to a user terminal and the information storage system,
   the control unit configured to:
   acquire the external state information, the financial transaction condition, the customer state information, and the financial transaction state of the same evaluation time, from the information storage system, wherein:
   the external state information includes information regarding at least one of economic indicator, market, or interest rate; and
   the customer state information includes information regarding a distribution of segments to which customers belong, the segment of the customer being determined by customer attribute of the customer including at least one of an age, a gender, or an occupation of the customer;
   perform machine learning using a data set made up of the acquired pieces of information as learning data, and generate a customer action prediction model which associates the financial transaction condition with the financial transaction state; and
   calculate, for a current external state and a current customer state, a financial transaction condition corresponding to a target value of a transaction state using the customer action prediction model.

2. The banking operation support system according to claim 1, wherein
   an interest rate is used as the financial transaction condition.

3. The banking operation support system according to claim 1, wherein
   the financial transaction includes at least one of deposits and loans, and
   a management state of a bank is predicted on the basis of a deposit state and a loan state as the financial transaction state.

4. The banking operation support system according to claim 1, further comprising:
   a management information storage that stores an asset situation of a bank, wherein
   the control unit is further configured to:
   acquire an amount of funding and investment calculated on the basis of the asset situation stored in the management information storage; and
   calculate a balance sheet on the basis of the amount of funding and investment.

5. The banking operation support system according to claim 1, wherein
   the control unit is further configured to:
   acquire a target balance sheet and specifies an amount of funding and investment in the target balance sheet; and
   calculate a target value of the financial transaction state on the basis of the amount.

6. The banking operation support system according to claim 5, wherein
   the control unit is further configured to:
   generate a bank action prediction model that associates a bank action pattern with a balance sheet using learning data including respective evaluation results of external state information of a bank, cash and deposits, a bank action pattern, and a balance sheet.

7. The banking operation support system according to claim 1, wherein
   the information storage system further stores regulation information on a financial transaction, and
   the control unit is further configured to:
   predict a bank action using the regulation information on the financial transaction stored in the information storage system.

8. A method for supporting a banking operation using a banking operation support system including:
   an information storage system that stores, for a plurality of evaluation times, a financial transaction condition of a financial transaction for each evaluation time of the plurality of evaluation times, customer state information for each evaluation time, history information including financial transaction state with a customer for each evaluation time, and external state information for each evaluation time; and
a control unit connected to a user terminal and the information storage system,
the control unit is configured to:
acquire the external state information, the financial transaction condition, the customer state information, and the financial transaction state of the same evaluation time, from the information storage system, wherein:
 the external state information includes information regarding at least one of economic indicator, market, or interest rate; and
 the customer state information includes information regarding a distribution of segments to which customers belong, the segment of the customer being determined by customer attribute of the customer including at least one of an age, a gender, or an occupation of the customer;
perform machine learning using a data set made up of the acquired pieces of information as learning data, and generate a customer action prediction model which associates the financial transaction condition with the financial transaction state; and
calculate, for a current external state and a current customer state, a financial transaction condition corresponding to a target value of a transaction state using the customer action prediction model.

9. A non-transitory computer-readable media comprising a program for supporting a banking operation using a banking operation support system including:
 an information storage system that stores, for a plurality of evaluation times, a financial transaction condition of a financial transaction for each evaluation time of the plurality of evaluation times, customer state information for each evaluation time, history information including financial transaction state with a customer for each evaluation time, and external state information for each evaluation time; and
 a control unit connected to a user terminal and the information storage system,
the program, when executed by the control unit, causing the control unit to:
acquire the external state information, the financial transaction condition, the customer state information, and the financial transaction state of the same evaluation time from the information storage system, wherein:
 the external state information includes information regarding at least one of economic indicator, market, or interest rate; and
 the customer state information includes information regarding a distribution of segments to which customers belong, the segment of the customer being determined by customer attribute of the customer including at least one of an age, a gender, or an occupation of the customer;
perform machine learning using a data set made up of the acquired pieces of information as learning data and generate a customer action prediction model which associates the financial transaction condition with a financial transaction state; and
calculate, for a current external state and a current customer state, a financial transaction condition corresponding to a target value of a transaction state using the customer action prediction model.

\* \* \* \* \*